Dec. 15, 1959   J. B. BRENNAN   2,917,683
ELECTROLYTIC CONDENSERS
Filed Oct. 31, 1955   2 Sheets-Sheet 1

INVENTOR
JOSEPH B. BRENNAN
BY
ATTORNEYS

Dec. 15, 1959   J. B. BRENNAN   2,917,683
ELECTROLYTIC CONDENSERS
Filed Oct. 31, 1955   2 Sheets-Sheet 2
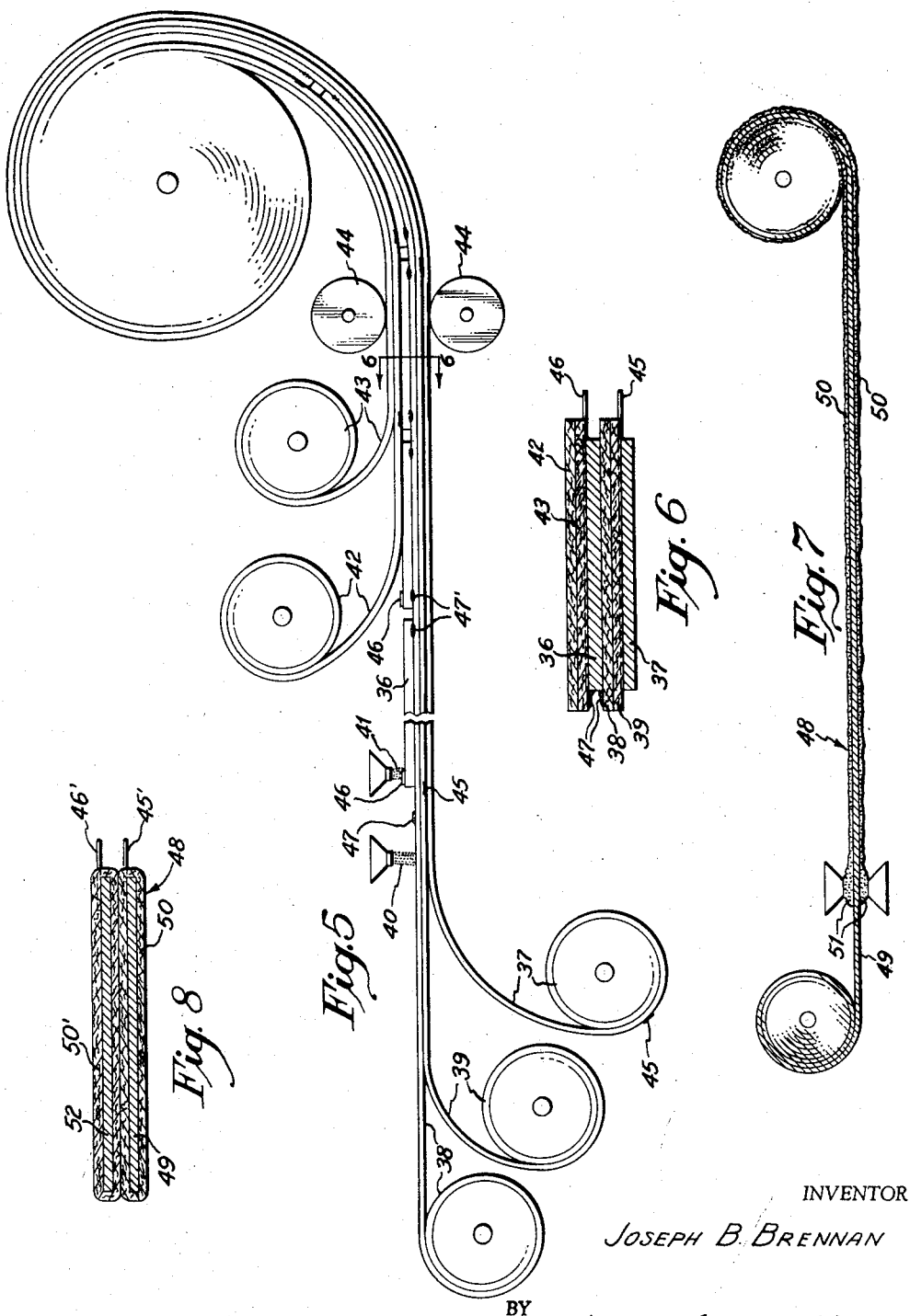
INVENTOR
JOSEPH B. BRENNAN
BY
Young, Emery & Thompson
ATTORNEYS United States Patent Office 2,917,683
Patented Dec. 15, 1959

2,917,683

ELECTROLYTIC CONDENSERS

Joseph B. Brennan, Cleveland, Ohio

Application October 31, 1955, Serial No. 543,829

7 Claims. (Cl. 317—230)

This invention relates to electrolytic condensers, rectifiers, lightning arresters and the like and to methods of making the same, and more particularly to spacers for such devices and methods of assembling devices embodying such spacers. The invention is described herein as applied to an electrolytic condenser of the paste type, but it is also useful in connection with other electrolytic devices such as rectifiers, lightning arresters, other types of condensers and the like. In so far as common subject matter is concerned, this application is a continuation-in-part of my copending application Serial No. 209,270, filed February 3, 1951, now Patent No. 2,722,637, which in turn is a continuation-in-part of my applications Serial No. 698,865, filed September 23, 1946, and Serial No. 709,859, filed November 14, 1946.

Electrolytic condensers of the so-called dry or paste type ordinarily comprise two or more electrodes composed, for example, of aluminum foil or of cloth sprayed with aluminum, provided with suitable terminals and separated by thin permeable separators. At least one of the electrodes is provided with an electroformed dielectric film, and the electrolyte is a pasty composition containing a borate or other film-forming or maintaining material. The assembly of electrodes and intermediate separators is ordinarily rolled into a generally cylindrical form; the separators function not only to prevent contact between the electrodes but also to retain the electrolyte in the space between the electrodes. Heretofore separators for electrolytic condensers have been made of cloth woven in open mesh form from highly purified cotton or of paper which has been carefully treated and purified to eliminate any damaging substances therefrom. Both of these materials are relatively expensive, and the cost of the separators is a not inconsiderable portion of the cost of the completed condenser. Furthermore, such separators are not entirely satisfactory from an operating standpoint because the permeability and thickness of the cloth spacers are not uniform throughout due to their woven construction, while the paper spacers are of lesser permeability and may contain impurities.

It is, therefore, a general object of the present invention to provide separators which are less expensive than and have operating characteristics superior to the separators heretofore employed. Other objects are the provision of condenser assemblies embodying such separators and the provision of methods for making condensers embodying such separators.

According to the present invention, the above and other objects and advantages are attained by employing as separators in electrolytic condensers thin, dry laid, loose layers of unwoven, untwisted fibers in which the fibers extend preferably in random directions. These layers are extremely permeable because of the looseness of the arrangement of fibers which are not felted together in the manner of the fibers making up a paper sheet. In fact, the layers are so loose and thin as to have very little tensile strength, the fibers being held in place in the assembled condensers principally by the pressure of the electrodes on either side of the layers of fibers. Such fiber layers are highly advantageous in condensers because they are of substantially uniform thickness, and of uniformly high permeability throughout. Because of the uniformity and high permeability of my spacers, the spacing of the electrodes can be less than with conventional woven spacers, and efficient use can be made of the entire electrode area.

The separators consisting of layers of fibers can be manufactured and incorporated in condensers much more economically than conventional separators for the reason that the weaving or felting operations required in conventional woven separators and conventional paper separators, respectively, are eliminated. The fibers may be formed into thin, loose batts and assembled with the electrodes to constitute the separators, or they may be applied to the electrodes immediately before the electrodes are rolled together or otherwise assembled in the form of loose, discrete fibers. After the electrodes and separators have been rolled into cylindrical form or otherwise assembled, the condensers are impregnated with the film-maintaining electrolyte, which may be of any suitable composition known to those skilled in the art.

In case synthetic thermoplastic fibers are used in carrying out this invention, the edges of the separators so produced extending beyond the electrode edges may be best sealed to hold them in place prior to rolling, and may be heat attached at the edges of the electrodes at spaced intervals to prevent shifting during winding and also to hold the electrode and the separator in place prior to winding and thereafter. This heat bonding of the separator to the electrode is accomplished by heated rolls or heated projecting areas on rolls which will fuse the thermoplastic fiber in small spaced areas sufficient to keep the electrode and spacer in alignment.

If preferred, synthetic fiber batts may be prewelded before incorporation in the condenser assembly at spaced intervals by heat and pressure application or by heat alone so as to make the batt easier to handle prior to and during winding and assembly.

Where multiple anodes are assembled on a spacer in aligned spaced relation prior to winding, they may be heat sealed or cemented on location on the spacer prior to assembly, and this speeds up and makes the alignment more accurate. Also it permits segregation of the work among several work positions and simplifies the operations and assembly of condensers. It helps greatly in assembling stacked condensers also by keeping the stacked plates and separators in alignment.

Referring now to the drawings.

Figure 4:
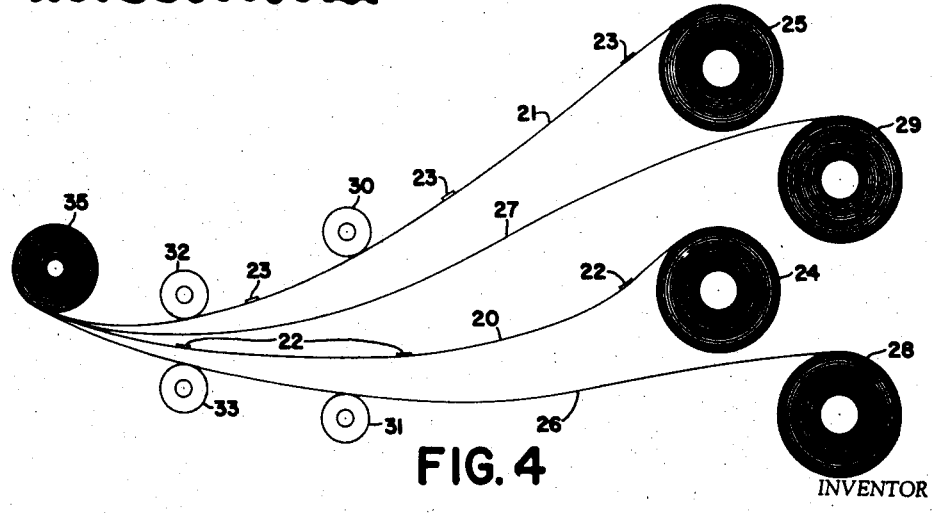

Figure 4 diagrammatically illustrates one method of assemblying condensers embodying my invention;

Figure 5 is a view similar to that of Figure 4 illustrating a modified form of invention;

Figure 6 is a cross-sectional view of the assembly produced by the apparatus of Figure 5;

Figure 7 is a diagrammatic view of a cathode strip being covered on both sides with a porous dielectric coating, and Figure 8 is a cross-sectional view of a portion of the completed electrode assembly made according to Figure 7.

In all of the figures of the drawings, the parts are necessarily indicated in somewhat diagrammatic fashion; the thicknesses of the parts are exaggerated and are not necessarily in correct proportion.

Figure 1:
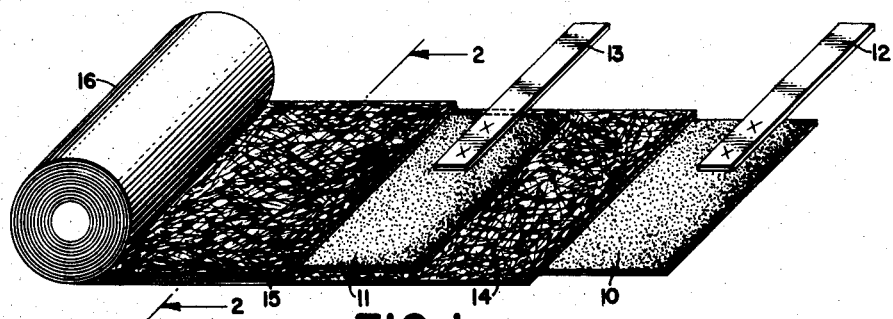
Figure 1 illustrates a more or less conventional rolled type of condenser with the electrodes and separators partially unrolled to show the construction.

As shown in Figure 1, a condenser embodying my invention may comprise electrodes 10 and 11 provided with suitable terminals 12 and 13, respectively, welded or otherwise secured thereto and spaced apart by separators 14 and 15, the electrodes and separators being rolled into substantially cylindrical form as indicated at 16. The completed assembly is impregnated with a suitable viscous film-maintaining electrolyte paste, composed, for example, of glycol and boric acid, and the whole may be encased in a suitable cover composed of cardboard or metal or the like (not shown). It will be evident that the condenser may take any well-known form and be made in various sizes and capacities.

Figure 3:
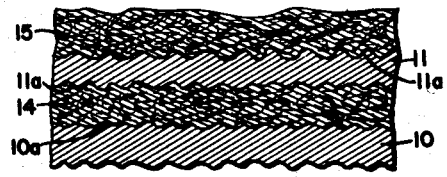
Figure 3 is a section on an enlarged scale showing the manner in which the fibers are held between electrodes having roughened surfaces.

The electrodes 10 and 11, while they may be composed of ordinary aluminum foil or foil composed of another film-forming metal, are preferably provided with roughened surfaces to give them increased effective area, and accordingly to give the condenser increased capacity per square inch of electrode. If aluminum foil is employed, it may be etched in the manner described in my Patent No. 2,154,027, issued April 11, 1939, to roughen its surface and give it additional area. Foil coated with sprayed film-forming metal, as described in my Patent No. 2,104,018, issued January 4, 1938, may also be employed; instead of using foil, I may employ a cloth base electrode having spray-deposited surfaces of film-forming metal as described in my Patent No. 2,280,789, issued April 28, 1942, or other electrode construction may be used. The roughened surface electrodes are not only advantageous because of the additional capacity obtainable thereby, but also are especially advantageous with my fiber layer separators because the roughened surfaces of the electrodes assist in retaining the fibers in place. This effect is diagrammatically illustrated on an enlarged scale in Figure 3 of the drawings, the roughened surfaces of the electrodes being illustrated at 10a and 11a.

The separators 14 and 15 consist, as noted above, of thin loose layers of fibers arranged in random directions. The fibers must be composed of material which will not react with the electrolyte or otherwise contaminate the condenser and which can withstand the temperatures the condenser may reach in operation. Purified cellulosic fibers are particularly suitable. The fibers may be of short staple such as cotton linters, purified cellulosic fibers from wood pulp, viscose rayon scrap or waste, or cotton fibers or any organic fiber or synthetic textile fibers, which have the ability to withstand the conditions encountered in the condenser without contaminating it, such as nylon, may be employed. The assembly may be carried out by laying a thin batt composed of fibers on the electrode 10 to constitute the separator 14, then positioning the electrode 11 on top of the separator 14 and finally applying another batt on the surface of the electrode 11 to constitute the separator 15. These operations may be carried out with the parts in a flat, horizontal position. The assembly is completed by rolling the electrodes and interleaved separators into substantially cylindrical form as shown at 16, and thereafter impregnating the assembly with the electrolyte. The impregnation is ordinarily carried out by immersing the assembly in a vat of heated electrolyte and subjecting it alternately to vacuum and pressure to insure that substantially all of the air will be removed from the spaces between the electrodes and that the electrolyte will fill all of the space between the electrodes and permeate the separators, and electrodes themselves if they are of porous construction. The impregnation may also be carried out in a centrifuge, or by pressure alone or by immersion alone.

Instead of employing batts, the fibers may be deposited on the electrodes in free, i.e., discrete, form as by spraying them on with a spray gun or by sifting them on through a screen, thereby forming the layer in situ. If either of these methods are employed, the electrodes are preferably coated with a pasty material as noted above to retain the fibers in position during the operation of depositing them on the electrodes. The paste may be, for example, composed of glycol and boric acid where a compatible electrolyte, or one of similar composition, is to be employed; the paste may be thicker and more viscous than the electrolyte. The paste may be applied by painting the electrodes prior to deposition of the fibers, by spraying the electrodes with the paste either before the fibers are deposited thereon, or simultaneously with the spraying the fibers thereon, or by mixing the paste and fibers together and coating the mixture onto the electrodes as by spraying. The assembly is completed in the manner described above, and after assembly, the pressure of the electrode faces on the fiber layers compresses the layers of substantially uniform thickness and retains the layers securely in position.

The fibers may be applied to the electrode surfaces immediately before the electrodes are rolled into cylindrical form, the rolling operation compressing the fibers into layers of substantially uniform thickness and retaining them in place. The operations of rolling and depositing the fibers may be carried on simultaneously. For example, when separators in the form of batts are employed, they may be fed into the rolling apparatus with the electrodes.

An apparatus for carrying out this operation is illustrated diagrammatically in Figure 4 of the drawings. As there shown, electrode strips 20 and 21 having terminals 22 and 23 secured thereto at intervals corresponding to the ultimate length of the electrodes may be fed from supply rolls 24 and 25. Separators 26 and 27 in the form of thin loose batts composed of cotton or other suitable fibers are simultaneously fed from supply rolls 28 and 29, suitable guide rolls 30, 31, 32 and 33 being employed to guide the electrodes and interposed separators together. The strips are wound into cylindrical form as at 35 to provide the electrode and spacer assembly. The electrode strips and spacers are severed after the length desired for one assembly has been wound; the winding operation is then started over again to make another assembly, the strip again severed, and so on, each severed portion of the electrodes being provided with a terminal.

If the fibers are applied in discrete form, they also may be applied to the electrodes as the electrodes are moving to the rolling apparatus, the rate of deposition and the speed of movement of the electrode strip being correlated to produce layers of the desired thickness.

Figure 2:
Figure 2 is a section through the condenser of Figure 1 as indicated by the line 2—2 of Figure 1.

It will be noted that the fibers, as shown in Figure 2, preferably extend beyond the edges of the active electrode surfaces; individual fibers of the layers projecting as indicated at 17 in Figure 2 prevent any possibility of short-circuiting at the edges.

From the foregoing description of preferred forms of my invention, it will be seen that I have provided separators for electrolytic condensers and similar devices which can be manufactured at low cost and which will give excellent results in use. Condenser assemblies embodying my invention can be manufactured economically and expeditiously by the methods disclosed herein. The fibers used may be subjected to purifying operations before incorporated in the condensers, and after being purified, the fibers require no handling prior to the incorporation in condensers as distinguished from the spinning, weaving, felting and like operations required in the manufacture of gauze and paper separators. The elimination of these operations not only results in an economical separator construction, but reduces the possibility of contamination of the completed device by reason of impurities in the separator.

In the preparation of condensers with multiple anodes an arrangement such as shown in Figure 5 of the drawings is used. As illustrated, all the anodes 36 which are separated are laid upon the top of the cathode 37 which is spaced from the cathode by two sheets of material 38 and 39 which may be porous paper for example.

The anodes are laid out first in a long trough where they are accurately aligned and have had some thermoplastic material applied to the top separator 38, through the applicators 40 and 41 so that there are at least spots or continuous narrow strips 47 of thermoplastic, tacky material and the additional dielectric separators 42 and 43 which are porous are applied during the winding of the condenser after all the anodes are laid out flat in a trough on top of the cathode which is covered with the dielectric separators 38 and 39.

The rolls 44 are heat rolls or heat application rolls for fusing the thermoplastic strands, or spots 47' of particulate thermoplastic material so that everything is kept in alignment during winding.

It will be noted that the cathode strip 37 is provided at intervals with terminals 45. Also the anodes are each provided with a terminal 46.

In a modified form of the present invention the cathode strip 37 may be enclosed between the two strips 38 and 39.

While two separator strips 42 and 43 are shown, it is possible to resort to a single such strip.

According to the present invention the separator strips 38, 39 and even the strips 42, 43 can be eliminated by using instead of the cathode strip 37 a cathode strip 48 as shown in Figure 7 which is formed by coating both surfaces of a porous metallic cathode strip 49 with a dielectric porous coating 50 which extends beyond the side edges of the metal strip 49. The coating can be applied in any suitable manner such as by depositing a suspension or spray-depositing fibers or particles of dielectric material. For this purpose the fibers or particles of dielectric material in a suitable suspension can be applied by applicators 51 to the porous cathode strip 49 which is on a porous drum, the application being first to one side and then the other side.

When employing the coated strips 48 of Figure 7, it will have the anodes 36 applied thereto in the same manner described in connection with Figure 5, the thermoplastic spots or strips 47 being applied to the coated strip 48 and the anodes.

In the arrangement according to Figure 5 as well as in the modification using the coated cathode strip, the spots or strips of porous thermoplastic material may be applied adjacent the side edges of the strip and also intermediate the side edges if desired.

This invention also contemplates a construction in which the anodes 52 as well as the cathode 49 are coated with porous dielectric coatings 50', 50 respectively, as described in connection with Figure 7. Such a construction is shown in Figure 8. The cathode 49 and anodes 52 are provided with terminals 45', 46' respectively.

The coated anodes may be applied to the cathode by the thermoplastic spots or strips as described in connection with the other forms of the invention. With such a construction the assembly of the electrodes in a desired relation can be insured.

The coated electrodes of Figure 7 can also be used in the assembly described in connection with Figures 1 to 4. In this case a coated electrode can be assembled with either another coated electrode or an uncoated electrode.

The coated electrodes in this application may be coated as set forth in my copending application Serial No. 540,237 filed October 13, 1955, and in this respect the present application is a continuation-in-part of application Serial No. 540,237 and its parent applications.

Those skilled in the art will appreciate that various changes and modifications may be made in my invention without departing from the spirit and scope thereof. It is, therefore, to be understood that my invention is not limited to the preferred forms described herein or in any manner other than by the appended claims.

Having described my invention, I claim:

1. A method of assembling an electrolytic condenser comprising feeding a metallic cathode strip to a winding station, simultaneously feeding spacer porous textile fiber material in strip form to the winding station, depositing a thermoplastic material onto the spacer material, applying a plurality of anodes onto the spacer material with the thermoplastic material interposed, feeding additional spacer material in strip form to the feeding station superposed on the anodes, heating the assembly to produce a bond between the anodes and the spacer material and then winding the assembly.

2. A method of assembling a multiple anode electrolytic condenser comprising feeding a metallic cathode strip having a coating of porous dielectric textile fiber material covering all surfaces thereof, depositing a thermoplastic material on the coating, positioning a plurality of anodes on the coating with the thermoplastic material interposed, heating the assembly to bond the anodes to the cathode, and winding the assemblage.

3. A method according to claim 2 including the additional step of coating the anodes with a porous dielectric material prior to their positioning on the metallic cathode strip.

4. A method of assembling an electrolytic condenser comprising feeding simultaneously a metallic cathode strip and porous unwoven textile fiber spaced material of uniform thickness to a winding station, applying a plurality of anodes onto the spacer material, bonding said anodes and cathode strip to the spacer material by dielectric fastening material, and compacting the cathode strip and the aligned plurality of anodes with the porous spacer material therebetween.

5. An electrode and spacer assembly comprising an elongated cathode strip and a plurality of anodes spaced apart in alignment with the longitudinal edge of the cathode strip, a dielectric spacer layer interposed between the cathode and anodes with the anodes dielectrically fastened to the spacer layer and to the cathode strip; said spacer layer comprising an unwoven synthetic mat of textile fibers.

6. The assembly as set forth in claim 5, wherein the spacer layer is porous and of uniform thickness.

7. The assembly as set forth in claim 6, wherein the spacer layer is a self-supporting strip and means for fastening it to the cathode strip and to the anodes.

References Cited in the file of this patent

UNITED STATES PATENTS

| | | |
|---|---|---|
| 1,770,465 | Edelman | July 15, 1930 |
| 1,798,287 | Ward | Mar. 31, 1931 |
| 2,055,216 | Edelman | Sept. 22, 1936 |
| 2,120,426 | Herrmann | June 14, 1938 |
| 2,206,720 | Ducati | July 2, 1940 |
| 2,209,820 | Koonz | July 30, 1940 |
| 2,307,488 | Clark | Jan. 5, 1943 |
| 2,497,066 | Brennan | Feb. 14, 1950 |
| 2,722,637 | Brennan | Nov. 1, 1955 |

FOREIGN PATENTS

| | | |
|---|---|---|
| 447,639 | Great Britain | May 22, 1936 |